United States Patent Office 2,712,516
Patented July 5, 1955

2,712,516

METHOD OF TREATING STEEP LIQUOR

Earl R. Kooi and Edward C. Snyder, Berwyn, Ill., assignors to Corn Products Refining Company, New York, N. Y., a corporation of New Jersey No Drawing. Application June 17, 1950,
Serial No. 168,851

7 Claims. (Cl. 195—48)

This invention relates to tthe treatment of acidic plant extracts, such as steep liquor, to recover valuable constituents therefrom, particularly, lactic acid, salts of phytic acid and nitrogenous materials.

Acidic plant extracts, such as corn and grain sorghum steep liquor, contain salts of phytic acid, carbohydrates, nitrogenous materials and inorganic materials. When these liquors are incubated lactic acid is formed therein. Corn steep liquor which has been incubated contains about 20 to 30 per cent lactic acid, dry basis; 10 per cent of salts of phytic acid; 50 to 55 per cent of soluble and insoluble nitrogenous materials; 15 to 20 per cent of inorganic materials; and 2 to 5 per cent of soluble carbohydrate material.

Lactic acid and salts of phytic acid have numerous uses which are well known, and, hence, their recovery from plant extracts is desirable. The nitrogenous materials are useful as nutrients for certain microorganisms, and hence their recovery is also desirable.

It is already known to recover certain constituents from steep liquor, for example, it is known to recover salts of phytic acid from corn steep liquor (U. S. Patent 1,716,286). It is also known to obtain steep liquor solids in dry form (U. S. Patent 1,313,163). However, the methods heretofore used in the recovery of lactic acid and salts of phytic acid from steep liquor alter the nitrogenous components of steep liquor in such a manner that these are useless for most purposes. Since the nitrogenous constituents are valuable and constitute about 50 per cent of the steep liquor solids, any method for recovering lactic acid and salts of phytic acid which alters the nitrogenous components in such a manner that these cannot be recovered in usable form is economically impractical.

It is an object of the present invention to provide an improved process for the recovery of the major valuable constituents from acidic plant extracts, such as corn or sorghum steep liquor. A further object is to recover these constituents in purer and more usable form than has heretofore been possible. Still a further object is to recover nutrient materials from steep liquor in dry form essentially free from hygroscopicity and from lactic acid. Yet another object is to prepare from steep liquor a dry, water-soluble, nutrient material which will not coagulate under conditions used in preparation of microbiological media and which is particularly useful in media in which the presence of insoluble materials interferes with recovery of fermentation products. Other objects will appear hereinafter.

Our invention consists essentially of first adding sulfuric acid to steep liquor which has been incubated to allow the formation of lactic acid therein. Either light steep liquor, i. e., that drawn directly from the steeps, or heavy steep liquor, i. e., that which has been concentrated to about 30° Bé. is satisfactory. Sufficient sulfuric acid should be added to decrease the pH of the steep liquor to 1.0 to 2.0. If the pH is above about 2.0, the efficiency of the extraction of lactic acid, to be hereinafter described, is decreased. On the other hand, if the pH is below about 1.0, no increase in efficiency over a pH of 1.0 is realized. Although the addition of the acid may increase the temperature of the steep liquor upon addition thereto, the temperature ordinarily does not arise above about 50° C.

The sulfuric acid converts the lactic acid salts present in the steep liquor into lactic acid which is then extracted from the steep liquor with butanol or any alcohol selected from the group of butyl, amyl, or hexyl alcohols. Those alcohols which are immiscible or partially miscible with water (i. e., not more than 40 per cent soluble in water) give better results than those which are highly soluble, and are preferred for purposes of the invention. To the acidified steep liquor is added butanol, for example, and the mixture is agitated vigorously for 15 to 30 minutes to extract the lactic acid. Longer times of extraction are not detrimental but do not increase the amount of lactic acid extracted. In general, for batch extraction, about as much butanol or equivalent alcohol as steep liquor should be used to obtain mixamum extraction of lactic acid. Generally, the acidified steep liquor should be extracted three successive times if batch operation is employed. If continuous countercurrent extraction is used with butanol as the extractant, the amount of butanol required will depend on the efficiency of the extraction equipment, but, in general, the ratio should be about two to three volumes of butanol per volume of 30° Bé. steep liquor.

The butanol or other alcohol used for the extraction may be anhydrous or water-laden. When water-laden butanol is used, the equivalent of four batch extractions may be necessary to extract all of the lactic acid from the steep liquor. The extraction may be carried out conveniently at room temperature. Higher temperatures are not detrimental unless sufficiently high to cause decomposition of nitrogenous constituents with resultant color increase in the nutrient.

The extract containing the lactic acid is separated from the acidified steep liquor and is then treated to convert the lactic acid therein to the ester. This is done by concentrating the extract under vacuum to about one-sixth its volume, and thereafter refluxing for one to two hours. Or, conversely, by evaporating at atmospheric pressure until essentially all of the water is removed, then either evaporating or refluxing at atmospheric pressure until esterification is essentially complete. After esterification is complete, the esterified liquor is cooled and the pH adjusted to 4.5 to 6.0 to prevent hydrolysis. Steam is now passed through the esterified liquor at a rapid rate and continued until the distillate layer no longer separates into two phases. The lactic acid ester is recovered in pure form from the upper layer of the distillate by vacuum or atmospheric fractional distillation. Other methods for recovering lactic acid from steep liquor as the esters are known, but in these the lactic acid is esterified in the presence of a preponderance of nitrogenous constituents. This causes hydrolysis and decomposition of the nitrogeneous constituents so that they are no longer useful for most purposes.

The acidified steep liquor from which the lactic acid has been extracted is next treated for the recovery therefrom of a nutrient for microorganisms. First, residual extractant is removed from the liquor by passing steam therethrough until the condensing vapor does not separate into two phases. To the residue from which the extractant has been removed is added sufficient calcium hydroxide to adjust the pH thereof to 5.5 to 7.5, the preferred range being 6.8 to 7.5. Other alkaline earth hydroxides may be used for the pH adjustment, but calcium hydroxide is preferred. The material is then transferred to an autoclave and heated at 10 to 20 p. s. i. steam pressure for 5 to 30 minutes. The treatment with steam under pressure is necessary to produce a nutrient which is soluble under conditions used in the preparation of liquid nutrient media. The temperature of the steam should not exceed about 250° F. However, the time may exceed 30 minutes without any detrimental effect, other than that the color of the product may be somewhat increased. Indeed, some improvement in the color of the product is attained by decreasing the heating time.

The autoclaved material is next filtered as by centrifugation. The cake thereby obtained, consisting mainly of calcium phytate and calcium sulfate, is washed well with water and the centrifugates combined. The centrifugates may be filtered if desired. The centrifugation or filtration is preferably carried out at high temperatures, e. g. within the range of 180° F. to 200° F., inasmuch as the rate of filtration is higher, and since calcium sulfate is less soluble at higher temperatures than at lower temperatures. The clear liquor leaving the centrifuge or filter is spray dried in a commercial type of drier. Other driers which are equivalent may be used also.

The nutrient thus obtained is entirely soluble in water and contains about 50 to 60 per cent nitrogeneous materials, 17 to 20 per cent inorganic material, 2 to 5 per cent carbohydrates, and 1 to 5 per cent salts of lactic acid, all on dry basis.

The cake obtained by filtering the autoclaved material above described consists primarily of crude calcium phytate and calcium sulfate. Purified calcium phytate may be obtained therefrom by dissolving the calcium phytate in hydrochloric acid at a pH of about 1.0 to 2.0, agitation for about two hours being required for the dissolution. The calcium phytate dissolves in hydrochloric acid at this pH whereas calcium sulfate is essentially insoluble so separation of the two materials may be effected. The suspension is filtered or centrifuged and the cake washed with water. The filtrates are combined and refiltered if not clear.

The filtrate is agitated and to it is added sufficient calcium hydroxide suspension to adjust the pH to 5.3 to 5.5. Agitation is continued for a short period to insure complete precipitation of calcium phytate. The calcium phytate is then separated and dried in conventional manner.

The following example which is intended as informative and typical only and not in a limiting sense will further illustrate the invention.

EXAMPLE

To 5000 ml. of corn steep liquor having a density of 28.5° Baumé was added 400 ml. of 95 per cent sulfuric acid. The resultant pH was 1.50. The acidified steep liquor was extracted with three successive 10,000 ml. portions of water-saturated butanol. The volume of the combined butanol layers (A) was 28,100 ml. The butanol was removed from the raffinate by steam distillation; 1000 ml. of water was added during this distillation to minimize foaming. The volume of distillate (B) was 3,200 ml., consisting of 1,140 ml. of water layer and 2,080 ml. of butanol layer. The raffinate was agitated vigorously and adjusted to pH 7.2 by slow addition of 500 g. of calcium hydroxide slurried in 2500 ml. of water. The neutralized raffinate was heated at 15 lb. steam pressure for 30 minutes. The hot raffinate was centrifuged; the cake was washed by suspension in two successive 3000 ml. portions of water. Volumes and gravities of the three centrifugates were 6700, 3100, 3030 ml., and 12.2, 5.5, 2.3° Baumé, respectively. The combined volume of the centrifugates, representing the soluble nutrient product (D) was 12,835 ml.

The wet centrifuge cake was reslurried in 2000 ml. of hot water, agitated vigorously, and adjusted to pH 1.5 by addition of 234 ml. of 36 per cent hydrochloric acid. After agitating for 30 minutes, the pH was re-adjusted to 1.5 and the mixture was agitated for an additional 90 minutes. The acid suspension was filtered under vacuum, and washed by reslurrying in two successive 1000 ml. portions of water. The filtrates (5030 ml.) were combined. The calcium sulfate filter cake was dried at 50° C. to 60° C. (E).

The combined filtrates were adjusted to pH 5.40 by addition of 123 g. of calcium hydroxide slurried in 490 ml. of water. The calcium phytate suspension was filtered under vacuum, and the cake was washed twice by resuspension in 1000 ml. portions of water. The filtrates were combined (F, 6795 ml.). The calcium phytate (G) was dried at 60° C.

The butanol extract (A) was evaporated at 25 to 27 inches vacuum to 7050 ml. The volume of distillate (H) was 19,450 ml. The evaporated extract was refluxed for one hour at atmospheric pressure, then evaporated slowly over a period of one hour. A total of 734 ml. of distillate (K) was collected, of which 43 ml. was water layer. The residue was cooled to room temperature and adjusted to pH 6.4 by addition of a solution of 380 ml. of 17 per cent (by weight) sodium hydroxide solution.

The partially neutralized liquor was heated to 100° C. and steam was passed through until the ratio of upper layer to lower layer in the condensing distillate was 0.045. The distillate (J) consisted of 6000 ml. of ester layer and 7300 ml. of water layer. The volume of the residue (I) was 1305 ml. The amount of steam used was 7,900 g.

The analyses of the original steep liquor, the various fractions and the constituents recovered therefrom are given in the table.

*Table*

|  | Steep Liquor, 5,000 ml. | Nutrient (D) 12,835 ml. | CaSO$_4$ Filter Cake (E) (610 g.) | Calcium Phytate (G) (387 g.) | Calcium Phytate Filtrate (F) (6,795 ml.) |
|---|---|---|---|---|---|
| sp. gr. | 1.245 | | | | |
| d. s. | 51.9% | 13.1 g./100 ml. | 92.6% | 90.9 | 4.53 g./100 ml. |
| Kjeldahl N, percent d. b. | 7.35 | 9.16 | 3.12 | 0.16 | 1.13. |
| Lactic acid, percent d. b. | 28.7 | 5.5 | 0.08 | | 0.7. |
| Total P, percent d. b. | 2.89 | 0.00 | 1.07 | 17.6 | 0.02. |
| Ash, percent d. b. | 17.3 | 26.4 | 65.9 | 74.9 | 62. |

|  | Distillate (H) 19,450 ml. | Distillate (K) 734 ml. | Residue (I) 1305 ml. | Butyl Lactate (J) | |
|---|---|---|---|---|---|
|  |  |  |  | Ester Layer (6,000 ml.) | Water Layer (7,300 ml.) |
| d. s., g./100 ml. | 0.13 | 1.00 | 54.0 | 10.8 | 0.60 |
| Kjeldahl N, percent d. b. |  |  | 3.90 |  |  |
| Lactic acid, g./100 ml. | 0.13 | 1.00 | 7.90 | 10.8 | 0.60 |
| Total P, g./100 ml. |  |  |  |  |  |
| Ash, g./100 ml. |  |  | 9.8 |  |  |

We claim:

1. Process of treating steep liquor from the group consisting of corn steep liquor and sorghum grain steep liquor which comprises incubating the steep liquor to form lactic acid therein, adding sulfuric acid thereto to decrease the pH to at least 2.0, removing the lactic acid therefrom by extraction with butanol, adding an alkaline earth hydroxide to adjust the pH to about 5.5 to 7.5, autoclaving the entire mixture at about 10 to 20 psi steam pressure, separating the liquid and solid phases and drying the liquid phase.

2. Process of treating steep liquor from the group consisting of corn steep liquor and sorghum grain steep liquor which comprises incubating the steep liquor to form lactic acid therein, adding sulfuric acid thereto to decrease the pH to at least 2.0, removing the lactic acid therefrom by extraction with butanol, adding an alkaline earth hydroxide to adjust the pH to about 5.5 to 7.5, autoclaving the entire mixture for about 5 to 30 minutes at about 10 to 20 psi steam pressure, separating the liquid and solid phases and drying the liquid phase.

3. Process of treating steep liquor from the group consisting of corn steep liquor and sorghum grain steep liquor which comprises incubating the steep liquor to form lactic acid therein, adding sulfuric acid thereto to decrease the pH to at least 2.0, removing the lactic acid therefrom by extraction with at least two volumes of butanol, adding an alkaline earth hydroxide to adjust the pH to about 5.5 to 7.5, autoclaving the entire mixture for about 5 to 30 minutes at about 10 to 20 psi steam pressure, separating the liquid and solid phases at a temperature within the range of about 180° F. to 200° F. and drying the liquid phase.

4. Process of treating corn steep liquor which comprises incubating the steep liquor to form lactic acid therein, adding sulfuric acid thereto to decrease the pH to at least 2.0, removing the lactic acid therefrom by extraction with butanol, adding calcium hydroxide to adjust the pH to about 6.8 to 7.5, autoclaving the entire mixture for about 5 to 30 minutes at about 10 to 20 psi steam pressure, separating the liquid phase and the solid phase, drying said liquid phase, dissolving the calcium phytate in the solid phase in hydrochloric acid at a pH of 1.0 to 2.0 and reprecipitating calcium phytate therefrom by adding calcium hydroxide to adjust the pH to 5.0 to 5.5.

5. Process of treating corn steep liquor which comprises incubating the steep liquor to form lactic acid therein, adding sulfuric acid thereto to decrease the pH to at least 2.0, adding at least twice the volume of butanol and agitating the system for 15 to 30 minutes to extract lactic acid therefrom, adding calcium hydroxide to adjust the pH to about 6.8 to 7.5, autoclaving the entire mixture for about 5 to 30 minutes at about 10 to 20 psi steam pressure, separating the liquid and solid phases at a temperature within the range of 180° F. to 200° F., and drying said liquid phase.

6. Process of treating steep liquor from the group consisting of corn steep liquor and sorghum grain steep liquor which comprises incubating the steep liquor to form lactic acid therein, adding sulfuric acid thereto to decrease the pH to at least 2.0, removing the lactic acid therefrom by extraction with an alcohol from the group consisting of butyl, amyl and hexyl alcohols, adding an alkaline earth hydroxide to adjust the pH to about 5.5 to 7.5, autoclaving the entire mixture for about 5 to 30 minutes at about 10 to 20 psi steam pressure, separating the liquid and solid phases and drying the liquid phase.

7. Process of treating steep liquor from the group consisting of corn steep liquor and sorghum grain steep liquor which comprises incubating the steep liquor to form lactic acid therein, adding sulfuric acid thereto to decrease the pH to at least 2.0, removing the lactic acid therefrom by extraction with an alcohol from the group consisting of butyl, amyl and hexyl alcohols, adding an alkaline earth hydroxide to adjust the pH to about 5.5 to 7.5, autoclaving the entire mixture at about 10 to 20 psi steam pressure, separating the liquid and solid phases and drying the liquid phase.

References Cited in the file of this patent

UNITED STATES PATENTS

| Number | Name | Date |
|---|---|---|
| 2,082,711 | McHargue | June 1, 1937 |
| 2,444,176 | McCalip et al. | June 29, 1948 |
| 2,448,680 | Myers et al. | Sept. 7, 1948 |
| 2,474,046 | Fires | June 21, 1949 |
| 2,477,763 | Moyer | Aug. 2, 1949 |
| 2,515,157 | Parsons | July 11, 1950 |